A. WEBSTER.
Potato Planter.

No. { 2,009, 33,013. }

Patented Aug. 6, 1861.

Witnesses:

Inventor:

UNITED STATES PATENT OFFICE.

ALONZO WEBSTER, OF WHITE RIVER JUNCTION, VERMONT.

IMPROVEMENT IN SEED-SOWING MACHINES.

Specification forming part of Letters Patent No. 33,013, dated August 6, 1861.

*To all whom it may concern:*

Be it known that I, A. WEBSTER, of White River Junction, in the county of Windsor and State of Vermont, have invented a new and Improved Seed-Planter; and I do hereby declare that the following is a full, clear, and exact description of the same, reference being had to the annexed drawings, making a part of this specification, in which—

Figure 1:
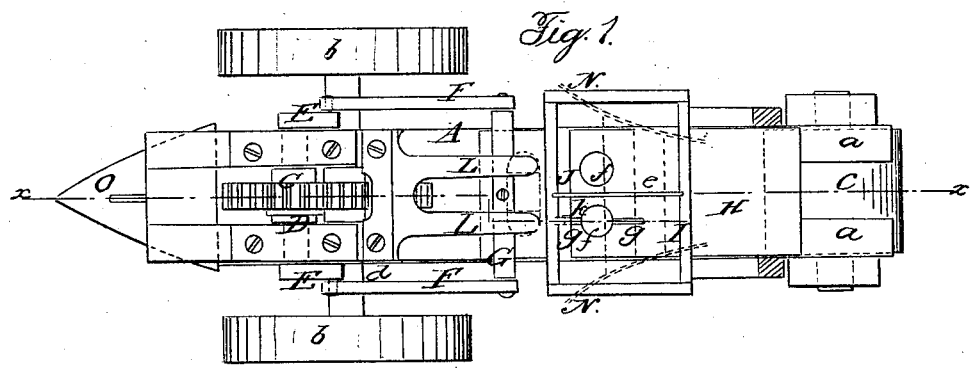
Figure 2:
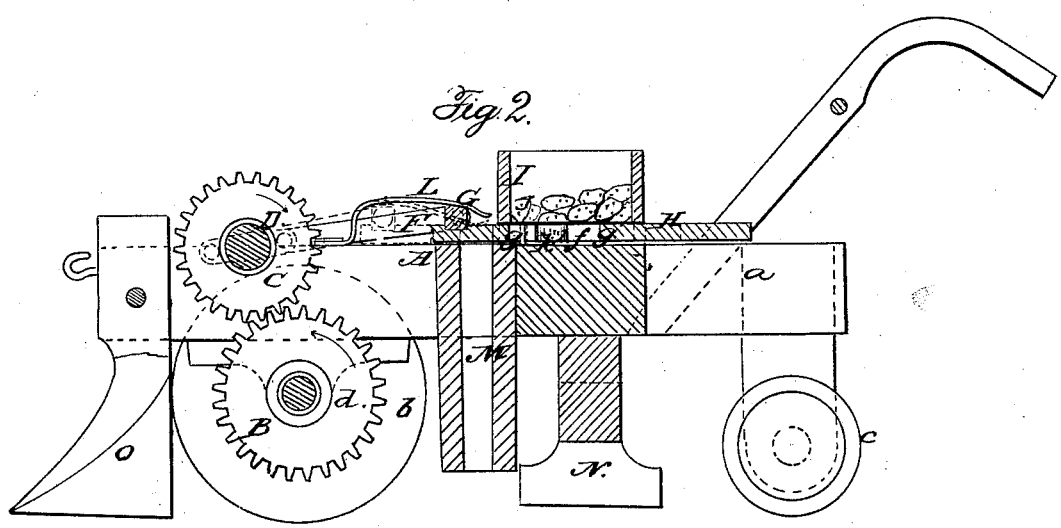

Figure 1 is a plan or top view of my invention; Fig. 2, a side sectional view of the same, taken in the line $x\,x$, Fig. 1.

Similar letters of reference indicate corresponding parts in the two figures.

This invention relates to a new and improved machine for cutting and planting potatoes, also for planting seed of various kinds, and sowing pulverulent manures. The object of the invention is to obtain a machine which will be simple in construction and capable of general adaptation, and one that will operate with certainty in all cases.

To enable those skilled in the art to fully understand and construct my invention, I will proceed to describe it.

A represents the frame of the machine, which is composed of two parallel bars, $a\,a$, supported at their front part by wheels $b\,b$ and at their back part by a roller, $c$. The axle $d$ of the wheels $b\,b$ has a toothed wheel, B, on it, and this wheel gears into a wheel, C, on a shaft, D, which shaft is placed on the front part of the frame A. At the ends of the shaft D there are placed cranks E E, which are connected by rods F F to a cross-bar, G, at the front end of a slide, H, which is allowed to work freely underneath a hopper placed on the frame A.

The hopper I is divided into two compartments by a central partition, $e$, and the slide H has two circular openings, $f\,f$, made in it, an opening being in each compartment, as shown in Fig. 1. In the lower part of the hopper I, at its front part and directly over the slide H, there is placed a horizontal knife, J, which extends the whole width of the hopper. The slide H adjoining one of the openings $f$ is slotted, as shown at $g$, said slot extending front and back of the opening, and in the top of the frame A there is secured vertically a knife, K, which is in line with the slot $g$, the latter being made in the slide H to receive the knife and admit of the slide working back and forth.

On the frame A there is secured a plate having two prongs, L L, the ends of which rest on the top of the slide H, and press a little thereon by virtue of their own elasticity. The prongs L L are in line with the openings $f$ of the slide H.

M represents a vertical tube, which is secured to the under side of the frame A, and at a point in front of hopper I, and N N are two covering-shares, which are directly back of the tube M.

O is a furrow-share, which is secured to the front part of the frame A.

The operation of the machine is as follows: As the device is drawn along the share O opens the furrow, and a reciprocating motion is communicated to the slide H from the wheels $b\,b$ by means of the gearing B C, cranks E E of shaft D, and the connecting-rods F F. If potatoes are being planted, they are placed in the compartment of the hopper in which the slot $g$ of the slide works, and each time the slide H is moved back a potato drops into hole or opening $f$, and as the slide moves forward the knife J cuts the potato horizontally and flush with the orifice of the opening, while the vertical knife K divides the lower part of the potato in the opening into two parts. As the openings $f$ pass over the top of tube M the prongs L L force out the contents of the openings into tube M, by which they are conveyed to the furrow made by share O.

The opening $f$ which is not provided with the slot $g$ is used for sowing or depositing pulverulent manure, the potatoes and manure being dropped simultaneously into the furrow.

In case of planting small seed or grain the horizontal cutter J serves as a cut-off, while the vertical cutter K serves to prevent the packing of the seed in the opening $f$, and insures its being readily discharged or forced out by the prongs L. A cutter, K, if desired, may be used in both openings $f$.

I would remark that in order to vary the capacity of the opening $f$ slides H of different thicknesses may be used, the hopper I being adjusted higher or lower to suit the thickness of the slide; and I would also remark that the seed may be dropped nearer together or farther apart by changing the gearing B C, so as to increase or decrease the speed of the slide H.

I do not claim broadly a reciprocating slide provided with seed cells or openings for discharging the seed from the hopper; but I do claim as new and desire to secure by Letters Patent—

The horizontal and stationary knives J K, applied respectively to the hopper I and frame A, and in relation with the openings $f$ and slots $g$ of the slide H to operate as and for the purpose set forth.

ALONZO WEBSTER.

Witnesses:
 LAURA A. WEBSTER,
 DARIUS RUSS.